United States Patent Office 2,851,409
Patented Sept. 9, 1958

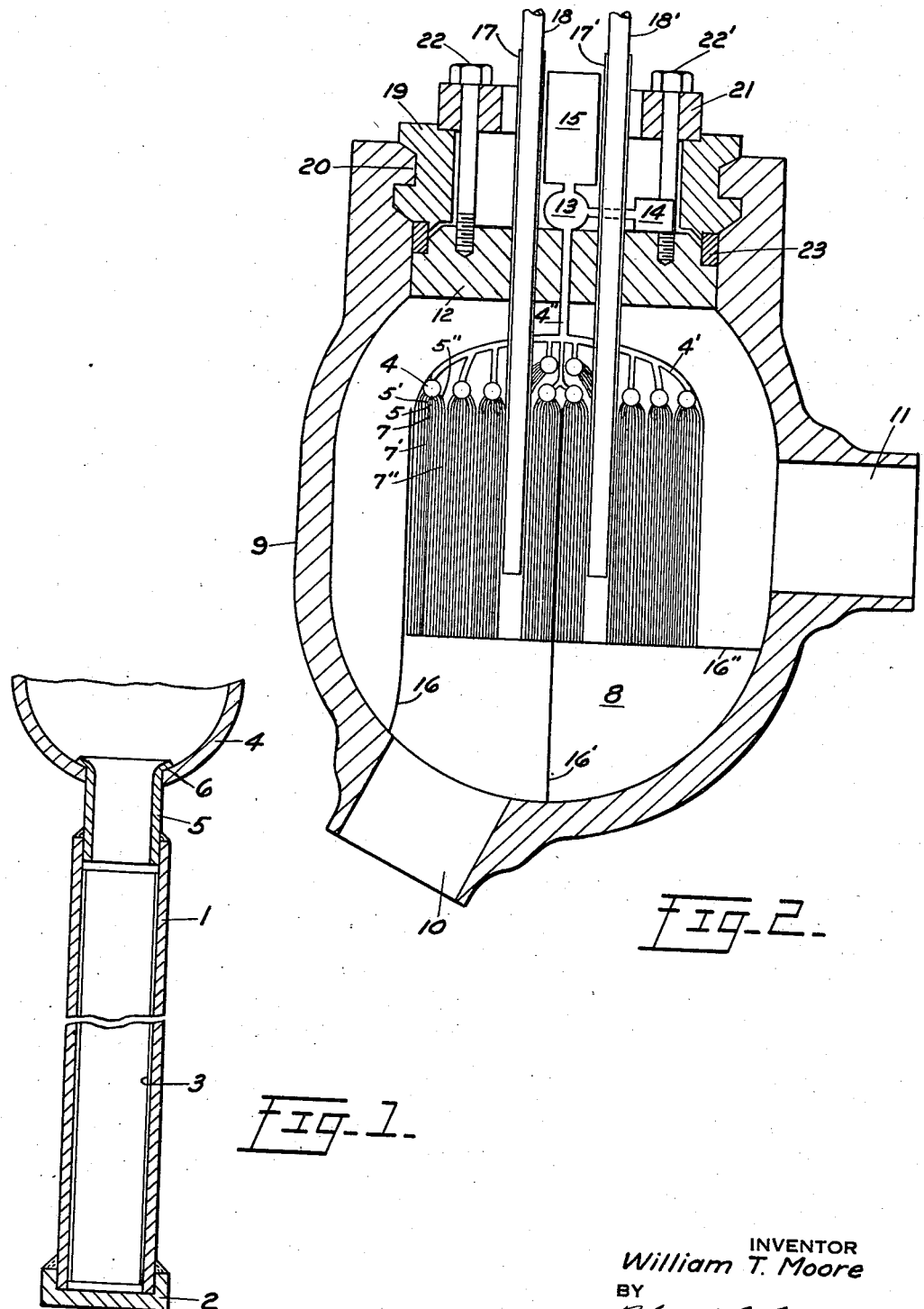

2,851,409

NEUTRONIC REACTOR FUEL ELEMENT AND CORE SYSTEM

William T. Moore, Chatham, N. J., assignor to the United States of America as represented by the United States Atomic Energy Commission Application November 18, 1952, Serial No. 321,117

16 Claims. (Cl. 204—193.2)

The present invention relates in general to neutronic reactors, and more particularly to an improved fuel element for a neutronic reactor, and to a novel reactor core system adapted to utilize such fuel elements, for facilitating removal of contaminating fission products, as they are formed, from association with the fissionable fuel, so as to mitigate the interferent effects of such fission products upon reactor operation.

As is known, certain particular isotopes, termed fissionable materials—prominent among which are uranium 235, plutonium 239, uranium 233, and others, and all of which, by definition, are capable of undergoing fission upon capture of a slow neutron—upon being subjected to neutron bombardment, absorb neutrons of indiscriminate energies and thereupon undergo fission. In fission, the atomic nucleus of the fissionable isotope, upon the absorption of a neutron, splits into a plurality of fragments of greater mass than an alpha particle, which splitting is accompanied by the release of a relatively enormous amount of energy and a plurality of neutrons. By virtue of the fission reaction's generating more new neutrons than it consumes, it is possible, by amassing sufficient fissionable material under appropriate conditions, to form an aggregate system capable of generating neutrons at a rate equal to or greater than that at which they are being lost to the system as the result of absorption in the system or leakage from the system, and consequently capable of maintaining a self-sustaining neutron-induced chain fission reaction. Such an amassment constitutes the essence of a neutronic reactor, and may be termed the "core" of a neutronic reactor; the masses of fissionable material sufficient to generate neutrons at a rate equal to, and greater than, loss are referred to as a "critical mass," and a "supercritical mass," respectively.

While the neutrons generated in the fission reaction are generally of quite high kinetic energy, it happens that the propensity of fissionable isotopes for absorption of neutrons leading to fission prominently increases with decrease in the kinetic energy of the neutrons, with generally the greatest susceptibility to such absorption obtaining in the instance of neutrons which are so slow as to be in substantial thermal equilibrium with the system (e. g., neutron kinetic energy of ca. 0.025 electron volt at 15° C.). Accordingly, it has become customary practice in most circumstances to incorporate in the amassment a substantial proportion of a material effective in markedly reducing the kinetic energy of neutrons upon their encountering the same, without contemporaneously absorbing neutrons to any excessive degree. Such a material is termed a "neutron-moderant," and may be more precisely defined as a non-gaseous material for which the ratio $$\frac{\xi \sigma_s}{\sigma_a}$$

is greater than 10, wherein $\xi$ is the average loss in logarithm of the energy of a fast neutron per elastic collision with the material, $\sigma_s$ is the slow neutron elastic scattering cross-section per atom of the material, and $\sigma_a$ is the slow neutron capture cross-section per atom of the material. Through serving to decelerate the neutrons to much more effective energy levels, such incorporated neutron-moderant will beneficially afford sizeable reduction in the amount of fissionable material necessary to constitute a critical mass.

Toward further reducing the amount of fissionable material required, and toward otherwise promoting increased reaction efficiency by conserving neutrons, it is also customary in many instances to encase the chain-reacting amassment in a layer of a material effective in reflecting otherwise-escaping neutrons back into the amassment. For reactor cores where neutrons of energy approximating thermal equilibrium preponderate, neutron-moderant materials are usually satisfactory for constituting such a neutron reflector.

Among the various practical uses of the neutronic reactor, particularly prominent is its application as a radically-advanced source of thermal power. Significantly, in fission, the specific energy content liberatable by nuclear reaction is enormous; the quantity and rate of thermal energy producable, per unit amount of fissionable material consumed, vastly surpass those producable by conventional chemical combustion. For example, in neutron-induced fission of the 235 isotope of uranium, the amount of thermal energy produced per pound of fuel consumed is of the order of 2,000,000 times that produced by aviation gasoline. Consequently, even in brisk operation as a heat source, a reactor's fuel depletion is comparatively insignificant, such that the initial charge of fuel is ordinarily sufficient to sustain the reaction indefinitely; with such a "furnace," the need for constantly replenishing the fuel is virtually eliminated. Similarly, since the chain fission reaction is inherently capable of operation at intensities on up to those orders manifested by the stellar temperatures attained in atomic bombs, the reactor as a heat source is normally adapted to operation at virtually any desired rate of energy release and temperature level that its structure and materials of construction can withstand. Furthermore, a chain fission reacting system admits of unusual compactness; especially when gross amounts of extraneous materials are excluded from the amassment, an operating reactor core may well be smaller than a few cubic feet in volume. By virtue of these attributes, the nuclear reactor has proven exceptionally promising for use as the ultimate heat source for power plants, particularly for stationary electric generating plants, and for mobile, propulsive power plants for ships and aircraft; of especial significance in mobile applications, where the afforded elimination of the need for any substantial amount of replacement fuel renders insignificant the formerly-limiting fuel capacity consideration, practically limitless range of such craft may be realized.

In the design of reactors for such purpose, normally a multiplicity of masses of fissionable material in solid form are amassed, conjointly with a neutron moderant, in sufficient quantity to constitute a critical amassment, through which a fluid heat-transfer medium is passed to extract the heat generated. Typical of this mode of construction, the reactor core would comprise a matrix of clustered blocks of a neutron moderant in ceramic or metal form, having disposed in hollows therein a multiplicity of masses of fissionable fuel also in ceramic or metal form, through which, via a system of ducts, is passed a heat-transfer liquid or gas to practically recover the heat produced. Since natural water is an excellent neutron moderant and a superior heat-transfer liquid, it has found frequent advantageous application for such purposes in power-producing reactors. Conveniently, water may be employed as both moderator and heat-transfer liquid simultaneously by constituting the core of an aggregation of spaced fissionable-material-comprising fuel elements disposed in a fixed lattice array and totally immersed in a bath of flowing water; by intimately surrounding and spacing the fuel elements, the water is positioned to serve effectively as the neutron moderator, and in flowing in the resulting heat transfer relationship through the lattice serves to recover and remove the heat generated in the core. For the quite high operational temperatures normally associated with practical-scale power production, it is appropriate to maintain the water under substantial superatmospheric pressure to avoid boiling of the same, with consequent reaction-disruptive erratic flutuations in the moderant content and moderating properties of the core.

Further, and characteristic of reactors generally, a solid fissionable-material-comprising fuel, if exposed to direct contact with the flowing heat-transfer fluid or to other mobile materials, would ordinarily suffer inordinate corrosion and erosion. Also, the fission reaction involves the progressive conversion of fissionable material of the fuel elements into fission products—i. e., the fragments formed upon fission and their radioactive decay products, comprising isotopes within the range of atomic numbers 30 to 63—which are, in general, intensely radioactive. While the reactor core and environs are normally enveloped in shielding adequate for protection against all sorts of harmful radiations, the escape of even very minor proportions of the generated fission products into the stream of heat transfer medium and passage therewith in its transit outside of the main reactor shield would normally be extremely hazardous both to personnel and to delicate equipment in the proximity. Accordingly, to safeguard against such deleterious erosion, corrosion, and chance straying of any fission product radioactivity beyond the shielding, it is conventional to encapsulate or sheathe the fissionable material in a substantially fluid-impermeable covering. Such covering is usually constituted of a coating of metal, preferably of low neutron absorptivity—for example zirconium, beryllium, or aluminum—and of sufficient thickness to preclude both ingress of fluids and egress of fission products; this covering is best bonded to the fissionable-material medium to promote thermal conductivity and thus facilitate liberation of generated heat to the heat transfer medium. Typical of the form of such sheathed fuel elements are short rods of natural-uranium-salt-impregnated graphite jacketed in individual closed capsules, thin plates of enriched uranium or enriched uranium alloy sandwiched between sheets of protective metal, or pluralities of pellets or pins of fissionable material of metal or ceramic nature cartridged together in closed tubes of the protective metal.

While fully affording the aforementioned extraordinary advantages in thermal power production, reactors of such conventional design have not proven unqualifiedly satisfactory for the purpose. In particular, a prominent difficulty regularly encountered with such reactors arises in connection with a need for periodic decontamination of fissionable fuel. A number of the fission products are voracious absorbers of neutrons; the progressive production of such fission products within the fuel itself results in ever increasing reaction inefficiency due to the growing wastage of neutrons to fruitless absorption in fission products, leading ultimately, and rather shortly, to total disruption of the chain fission reaction. Continued self-sustenance, then, of the neutronic reaction requires that the fission product accumulation be kept at a very low level. Among these, one exceptionally notorious fission product in this respect is the noble gas element, xenon, or more particularly the Xe-135 isotope thereof, which manifests a thermal neutron absorption cross-section of ca. $2.33 \times 10^6$ barns per atom—a propensity toward thermal neutron capture more than 4000 times that of uranium-235 ($\xi_a = 500$ barns). In practice, therefore, to avoid incurring excessive reaction inefficiency and disruption, it is customary to remove each amount of fissionable material, upon its becoming sufficiently contaminated, to be processed for elimination of the fission product contamination and isolation of purified fissionable material for reuse in the reactor. Disadvantageously, this normally involves either, a periodic, complete shutdown and major dismantling of the reactor or else a mechanism of undesirable, and often practically preclusive, ponderousness and complexity associated with the core for replacement and withdrawal of individual fissionable fuel elements as becomes necessary while maintaining continued operation of the reactor. Moreover, these difficulties, so deleterious during reactor operation, are particularly compounded upon proceeding to shut-down reactor operations and attempting to recommence operation thereafter. It happens that certain of the more voraciously neutron-absorbing fission products obtain not as fission fragment species formed directly upon fission, but rather are evolved as products of relatively slow chains of radioactive decay of original fission fragments. During reactor operation such neutron-absorptive isotopes, upon respectively capturing a single neutron, are thereby converted to a different isotope, usually of more or less innocuous neutron-absorption properties; by very virtue of their high neutron-absorptive propensities the most offensive fission products absorb their neutrons virtually immediately upon their formation, such that the fission reaction serves to maintain the operating system "burned out" of these offensive materials. Thus, although during operation such offensive materials adversely drain neutrons from the system, they will not accumulate in any sizeable amounts. However, upon shutting down the reactor, the offensive materials continue to be progressively produced through the persistence of the slow decay chains engendering the same, but now, in the absence of the fission reaction with its associated enormous neutron flux to burn them out, the offensive materials progressively accumulate in the system. Upon attempting the recommencement of reactor operation, such accumulation presents a formidable quantity of neutron absorbent to be dealt with and overridden all at once; the aggregate effect normally is such that criticality cannot be re-established after a short period of shutdown without the presence of a sizeable extra amount of fissionable material in addition to that required to sustain criticality during steady operation. Disadvantageously, this necessitates a considerably larger inventory of scarce fissionable material to afford regular reactor operation. Here again, xenon-135 is typical and most obnoxious among the such fission product species. In its case, each 100 fissions of $U^{235}$ statistically produce 6.3 atoms of tellurium-135, which isotope spontaneously decays through a slow chain through iodine-135 to xenon-135 and ultimately to stable barium-135, in accordance with the following decay scheme:

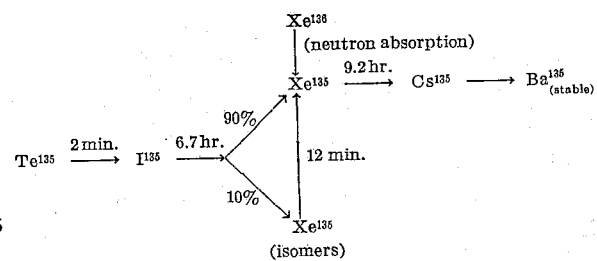

As shown, neutron absorption converts the highly neutron-absorptive Xe-135 to Xe-136, which by comparison has so trivial a thermal neutron absorption cross section as only 0.15 barns.

For further information and details as to the theory, construction, and operation of neutronic reactors generally, and the difficulties resulting from fission product accumulation in particular, reference may be made to the following sources: "The Science and Engineering of Nuclear Power," edited by Clark Goodman, vol. 1 (1947) and vol. 2 (1949), Addison-Wesley; and co-pending applications of the common assignee: S. N. 578,278, filed February 16, 1945, in the names of Enrico Fermi and Miles C. Leverett, for A Chain Reacting System, now Patent No. 2,837,477, dated June 3, 1958; S. N. 596,465, filed May 29, 1945, in the names of Enrico Fermi and Leo Szilard for Air Cooled Neutronic Reactor, now Patent No. 2,836,554, dated May 27, 1958; S. N. 194,331, filed November 6, 1950, in the name of George A. Anderson, for Neutronic Reactor, now Patent No. 2,780,596, dated February 5, 1957; S. N. 206,592, filed January 18, 1951, in the name of George A. Anderson, for Fuel Element Loading Apparatus for Neutronic Reactors, now Patent No. 2,794,562, dated June 4, 1957.

Consequently, there has been an increasing desire that new, effective reactor means be found for substantially mitigating these difficulties and deficiencies due to fission products produced directly within the fissionable fuel.

Accordingly, one object of the present invention is to provide a new and improved fuel element for a neutronic reactor which is adapted to continuous removal of fission products from the fissionable fuel during operation, and thus to affording extensive lengthening of the period of operation of fissionable fuel before decontamination reprocessing becomes imperative, and to effectually minimizing the quantity of extra fissionable material necessary for overriding the aggravated absorptivity of fission products accumulating after short periods of reactor shutdown.

Another object is to provide a new and improved neutronic reactor core system integrating a plurality of such fuel elements to afford such advantages.

A further object is to provide such a fuel element and core system which provides positive measures for avoiding escape of fission products into any stream of heat transfer fluid coursing through the reactor core and resulting hazardous transit therewith outside the main reactor shield.

Still another object is to provide such a fuel element and reactor core system adapted especially to the continuous removal of the particularly offensive fission product species, xenon-135.

Still a further object is to provide such a fuel element and reactor core system of practical fitness and suitability appropriate for large-scale power-production application.

Additional objects will become apparent hereinafter.

In accordance with the present invention, an improved fuel element for a neutronic reactor comprises a tubular structure having a thin layer of fissionable material on the interior surface thereof. In this way, by providing the fuel elements of a neutronic reactor in the form of closed tubes substantially impervious to fluids, having a layer of fissionable material approximating paper thinness—i. e., thinness of the order of one mil or so—disposed on the interior surfaces thereof, a considerable proportion of the gaseous fission products will diffuse from the layer of fissionable material into the interior cavity of the tubes, from where it may readily be withdrawn from the reactor core. Diffusion in such tubular means has proven to be especially effective in the case of the highly obnoxious xenon-135, as well as various other gaseous fission products; typically xenon-135, for example, seems to assume its noble gas form immediately upon the formation within the fissionable material, and tends directly to diffuse to, and out through, the uncovered interior surface of the layer of fissionable material. Such liberation of fission products by effusion of those in gaseous state is supplemented, although normally only slightly, by some escape to the interior cavity of those in other states. This obtains by virtue of the fact that upon the fission of an atom of a fissionable isotope, the formed fission fragments are ejected outward from the point of fission with considerable kinetic energy, such that the fragments have a mean range in air of ca. 20 millimeters and ca. 0.06–0.07 mils through uranium metal. Consequently, from fissions occurring within the order of a mean range or so from the exposed inner surface of the fissionable material layer, a significant proportion of the fission fragments, regardless of the incipient state of matter of the fragments, will become ejected into the interior of the tube immediately upon formation; while some will have sufficient kinetic energy to completely traverse the interior cavity and re-enter the layer of fissionable material on the opposite interior wall of the tube, others of lesser energy will halt within the cavity. By applying suction to evacuate the interior of the tube, the fission products in the interior thereof are drawn off and accordingly the aforementioned and other difficulties resulting from their presence within the reactor core are significantly mitigated.

For appropriately integrating such an improved fuel element in an overall nuclear reactor adapted to practical-scale power production, in further accordance with the present invention, an improved operationally-integrated core system for incorporation in a neutronic reactor, comprises a plurality of closed tubes substantially impervious to fluids, a layer of fissionable material approximating paper thinness disposed on the interior surface of each of said tubes, a closed manifold substantially impervious to fluids the interior of which communicates with the interior of each of said tubes, and means connected to said manifold for withdrawing and disposing of mobile fission product contamination from the interior of said manifold and tubes. As a practical arrangement, a multiplicity of slim-girthed, elongated, spaced, co-extensive tubes closed at one end, sealed into a common manifold system at the other, and internally coated with a layer of uranium metal of thinness of the order of one mil, desirably isotopically enriched in uranium 235, are arranged as a lattice, disposed within a matrix of an effective neutron moderant, and maintained in heat transfer relationship with a stream of a fluid heat transfer medium; a vacuum pump discharging into a shielded decay chamber is connected to the manifold system to afford evacuation of fission product fluids and particles from the interior of said tubes and accumulation of the same in the decay chamber wherein they are retained while their radiations safely subside. With such arrangement, the significant portions of the generated fission products are liberated into the interior cavities of the tubes from whence they may immediately be removed; consequently, the operational life of the fissionable material before reprocessing becomes necessary is increased, and the amount of fissionable material needed in the core for practical operation is reduced. For example, with such an arrangement, employing as the fissionable material uranium metal in a layer of 0.001 inch thickness disposed on the interior surfaces of the tubes and adapted to operate at a temperature of about 400°–700° F., while maintaining the interior tubes substantially completely evacuated, diffusion of as much as and even more than 75% of the gaseous fission product species, including the offensive xenon-135, will ensue, and virtually complete removal of the same is simply effectable by vacuum pumping; the fission product species so liberated represent a major proportion of the fruitless neutron absorptivity of the generated fission products. Having such beneficial attributes, the instant means clearly afford significant practical advantages to the neutronic reactor art.

Considering the constitution of the instant fuel element in more detail, for serving as the specified material impervious to fluids for constituting the tubular structure of the fuel elements, metal is preferred, although other materials substantially impervious to gases, such as glazed ceramics, glass, and the like are suitable. Metals having quite low neutron absorption cross sections, such as aluminum, zirconium, or beryllium, are particularly preferred, while for operational temperatures exceeding those at which such low-absorbing metals may be practically applied, use of metals better adapted to high temperature operations, such as stainless steel, becomes in order. For the form of fission material, a continuous layer of metal, bonded to the walls of the tubular structure, is especially advantageous in that it affords good conduction of heat to the supporting tubular structure—a matter of marked practical importance from the standpoint of recovering the thermal energy generated. Metallic uranium or plutonium, preferably enriched in one of their fissionable isotopes, such as uranium 235 or 233, or plutonium 239, respectively, are appropriate; substantially completely isotopically isolated uranium-235 is eminently suited for the purpose. Generally speaking, from the standpoint of liberation of fission products, the thinner the layer of fissionable material, the better. While it may be said that with a layer of fissionable material of any thickness, effusion of fission product gases from at least the strata near and at the exposed surface of the layer will afford some operative benefit, nevertheless the thinner the layer of fissionable material, the greater will be the proportion of fission products liberated to the interior cavities of the tubes, and the faster will be their liberation. It is also particularly desirable that the layer be thin in relation to the internal dimensions of the tube; with the thickness so being a small fraction of the inside radius of the supporting tube, the effusion-impeding substantial diminution of area of the inner surface which would geometrically obtain with layer thicknesses amounting to large fractions of the inside radius of the supporting tube is largely avoided, and also the internal cavity is maintained relatively capacious thereby further promoting substantially unimpeded removal of fission product gases. Upon these desiderata of thinness, though, is imposed the practical limitation that the layer of fissionable material should not be so inordinately thin that the area of a critical mass thereof—and hence the required overall number and length of tubes—will be so high as to exceed reasonable bounds for practical application. Upon balancing these conflicting requirements, layer thickness approximating one to several mils is the apparent optimum. With thicknesses of the layer of fissionable material of this low order, the supporting tubes may appropriately be of small internal diameter. These normally need be no more than a fraction of an inch in internal diameter to afford a fuel layer thin with respect to the material dimensions of such tube and yet avoid introducing any more unreactive void within the chain reacting amassment than is actually necessary for the purpose of efficient fission product removal. The length of the tubes would ordinarily depend on the overall dimensions of the critical amassment—normally between 1 and 3 feet in each dimension. To avoid unnecessary amounts of fruitlessly neutron-absorbing materials directly within the chain-reacting amassment, the wall thickness of the tubes should best approach the minimum consistent with adequate mechanical strength and imperviousness to gases and liquids, all in view of a probable operational pressure differential between likely pressurized heat transfer fluids and/or liquid moderants outside the tubes and substantial evacuation inside the tube system. For preparing the tubes, various conventional methods for depositing uranium or plutonium metal coatings within slender tubes, such as: electroplating using an inert metal wire down the center with a uranium salt solution inside the tube; vaporizing a uranium wire down the center of the tube; vapor-depositing uranium on the inside surfaces by passing a stream of uranic iodide vapor through the tube heated to a temperature between the decomposition temperature of uranic iodide and the melting point of metallic uranium, and the like, are applicable.

The particular design and constitution of a reactor incorporating such tubes as fuel elements therein are subject to considerable variation. Generally speaking, a reactor system comprising a plurality of discrete, solid fuel elements in any array may be benefitted by adopting the special tubular form of fuel element of the present invention. Particular advantage derives, however, from a reactor core system incorporating a multiplicity of the instant tubular fuel elements, in parallel, spaced, vertical array, each closed at the bottom and communicating into a common manifold system at its top. Such lattice is disposed in a matrix of effective neutron moderant intimately surrounding each of the tubes; such matrix may satisfactorily be constituted of any conventional neutron moderant, such as beryllium, beryllium oxide, graphite or deuterium oxide, but ordinary water is particularly preferred for the purpose because of its excellent neutron-moderating ability. Through the fuel-moderant amassment, a stream of heat-transfer fluid is passed, which may satisfactorily comprise various conventional media, for example, a molten metal such as liquid sodium, a molten salt such as liquid NaCl, helium or a gas such as or air, but again water is particularly preferred because it combines excellent neutron-moderating ability with excellent heat-transfer characteristics. In the preferred arrangement, where water constitutes both moderant and heat transfer fluid, the lattice of tubes is merely completely immersed in a body of water which, upon serving as moderant and upon becoming heated, is continuously circulated through a closed external path containing a suitable heat exchanger means for removing the generated heat from the water. By pressurizing the immersing water bath to an appropriate superatmospheric pressure, operation at temperatures well above 100° F., as is desirable in heat power engineering practice, is afforded, without incurring chain-reaction-disrupting boiling of the water. It is of added benefit to employ an immersing water bath of dimensions of several inches to one foot larger, on all sides, than the dimensions of the lattice of tubular fuel elements; in view of the notable thermal-neutron-reflecting properties of water, the resulting shell of water thereupon surrounding the lattice serves as an effective neutron reflector, thereby contributing to the neutron economy of the system and thus enhancing the efficiency of the fission reaction. It is usually desired that, within the bounds of the lattice, a sufficiently great proportion of moderant in relation to fissionable material be provided to thoroughly attenuate the kinetic energy of the neutrons generated in the fission reaction, such that the average energy of the neutrons in the core closely approximates that of thermal equilibrium at the ambient temperature. For this, where water is employed as the only neutron moderant, molar ratios of water to fissionable isotopes at least of the order of 100 to 1 are appropriate; where the material constituting the tubular fuel element structure is itself an effective neutron moderant, such as beryllium metal, commensurately lower ratios of water to fissionable isotope are suitable in view of the contribution of the tubular structure to neutron moderation. In either case, ordinarily no more than a fractional-inch spacing between fuel element tubes in the water bath will be necessary to achieve such desirable minimum ratios, particularly when employing tubes of the preferred fractional-inch diameters.

The quantity of fissionable fuel, and in turn the overall dimensions of the core in such an arrangement, necessary to constitute a critical mass, vary with the parameters affecting the rates of consumption and loss of neutrons therefrom, e. g. specific composition and nuclear properties of the fissionable material, moderant, tubular structure, and heat-transfer fluid employed, percentage of the tube-interior voids in the total volume, overall geometry of the core, proportion of fission products continuously liberated to and removed from the interior cavities of the tubular fuel elements, and the like. Such quantity and volume are quite accurately calculable, though, on the basis of known and accepted nuclear engineering theory; typically, for example, with such an arrangement employing substantially isotypically pure metallic uranium-235 to form a layer of the order of 0.001 inch thickness as fuel, within fractional-inch-diameter beryllium tubes, employing water as both the neutron moderant and heat transfer fluid, and employing a core geometry roughly approximating a sphere, a quantity of uranium-235 within the approximate range of 10 to 20 kilograms and a corresponding core volume within the approximate range of 7½ to 15 cubic feet, is normally adequate to provide a practically-operative critical mass. Upon thus providing a system susceptible to spontaneous chain fission reaction, it becomes appropriate to interpose a means for controlling the reaction rate—for example, the familiar rods or plates comprised of highly voracious neutron absorbing material, such as cadmium or boron, adapted to be adjustably inserted into the core for setting and maintaining the neutron flux level, and concomitantly the rate of fissioning, at whatever intensity that may be desired.

As the means provided for withdrawing mobile fission products from the interiors of the tubes and manifold, a standard piston-type vacuum pump, connected with inlet communicating with the manifold, and discharging into a small closed and radiation-shielded chamber maintained at approximately atmospheric pressure for retention of fission products to permit safe subsidence of their radioactivity, is well suited for the purpose. Since the quantities of fission products being removed are relatively very small, the volume of the decay chamber need ordinarily be no more than a few percent of the volume of the overall core, although larger volumes prove more convenient and efficient. Improved results are achieved by including within the decay chamber a bed of an effective adsorbent, such as activated charcoal, toward more effectively retaining the withdrawn fission product gases. Alternatively, especially in cases where reactor operation is not brisk, a bed of adsorbent in communication with the manifold-tubes system, all highly evacuated, is frequently adequate for withdrawing gaseous fission products from the interior of the tubes, at a satisfactory rate, without any intermediate vacuum pump being necessary; in such case the adsorbent bed will function more efficiently if its chamber is maintained refrigerated.

A more comprehensive and detailed insight into the present method and means is afforded by consideration of the specific apparatus preferred by applicant. While practice of the present invention in accordance with the foregoing general outline is not limited to any specific design of fuel element or overall neutronic reactor core system, the apparatus illustrated in the appended drawings is regarded as eminently efficacious for the purpose.

In the drawings:

Figure 1 is a simple cross-sectional illustration of a tubular fuel element consituted in accordance with the present invention.

Figure 2 is a cross-sectional elevation of a reactor core system assembly, in accordance with the present invention, incorporating such tubular fuel elements.

Referring to the reactor fuel element illustrated in Figure 1, a slender, elongated, cylindrical, substantially-fluid-impervious tube 1, closed at its lower end by a substantially-fluid-impervious cap 2, welded to the tube 1, to form a substantially-fluid-tight seal therewith, has disposed upon its inner surface a layer of fissionable material 3—in this case metallic uranium-235—of thinness approximately the order of a mil and also thin with respect to the internal diameter of the tube 1. At its upper extremity the tube 1, communicates with a means for continuous withdrawal of mobile fission product contamination from the interior of the tube represented by a portion of a manifold 4, through the agency of a substantially fluid-impervious connecting tube 5—provided to simplify assembly—sealed to the top of the tube 1, by welding, and sealed into an aperture in the manifold 4, by a flare 6, at its upper end.

Referring to the overall reactor core system diagrammed in Figure 2, which further demonstrates preferred application and operation of the fuel element illustrated in Figure 1, a generally vertical right cylindrical lattice array of a multiplicity of spaced, elongated, coextensive, substantially-fluid-impervious fuel tubes 7, 7', 7", such as that illustrated in Figure 1, closed at their lower ends, and communicating at their upper extremities into a common manifold system 4, 4', 4", through the agency of connecting tubes 5, 5', 5", are immersed in a body of flowing water 8. To retain said body of flowing water 8, a closed pressure vessel 9 is provided, having near its bottom a water inlet port 10, having at its side a water outlet port 11, and having at its top a normally closed and sealed, removable closure plug 12 for permitting access to the interior. Ascending vertically upward, in pressure-sealed relationship through the closure plug 12, an upper extremty 4", of the manifold system 4, 4', 4", leads to the inlet of a piston-type vacuum pump 13, mounted above the closure plug 12, driven by a directly-coupled electric motor 14, and discharging into a closed decay chamber 15. Within the pressure vessel 9, and extending vertically through the lattice array of fuel elements 7, 7', 7", a system of baffles 16, 16', 16", is provided to direct and constrain the flow of water through the pressure vessel: from its point of entrance through the water inlet port 10, first vertically upward through the interstices between the fuel elements in the left half of the lattice array, then down around the exterior of the left side of the lattice, from there up through the interstices in the right half of the lattice, and finally down around the exterior of the right side of the lattice and out the water outlet port 11. Vertically descending through, and affixed in pressure-sealed apertures through, the closure plug 12, are a plurality of closed cylindrical internally-unobstructed thimbles 17, 17', having reciprocably mounted therewithin respective control rods, 18, 18', comprised of a voracious neutron absorbing material, such as boron or cadmium, and adapted to be adjustably inserted into the lattice array of fuel elements 7, 7', 7", by the action of mechanical drive means connected thereto (not shown). For removably retaining and sealing closure plug 12, into the aperture provided therefor in the top of the pressure vessel 9, an interrupted-thread breach ring 19, is removably accepted and retained by an accommodating counterpart interrupted-thread shoulder 20, formed in the closure-plug-receiving aperture in the pressure vessel 9, said breach ring 19, being surmounted by and supporting a horizontal compression ring 21, from which, through the agency of a plurality of nutted stud bolts 22, 22', closure plug 12, is suspended. To seal the aperture so plugged, a ring gasket 23 is disposed in a chamfered recess formed in the opposed peripheral shoulders of the breach ring 19, and closure plug 12, and is adapted to be compressed to form a pressure-tight seal with the walls of the closure-plug-receiving aperture in pressure vessel 9, upon drawing the closure plug 12, upward closely toward the breach ring 19, by tightening the nutted stud bolts 22, 22'. For protecting personnel and delicate equipment in the proximity from harmful radiations emitted during operation, the entire reactor is enveloped in thick radiation shielding (not shown) such as 7–10 feet of ordinary concrete surrounding the pressure vessel 9.

In operation, a continuous stream of water under substantial superatmospheric pressure is introduced through water inlet port 10, whereupon it passes rapidly through the pressure vessel 9, and out the water outlet port 11, being constrained to a path first up through the interstices between the fuel elements in the left half of the lattice array, then down around the exterior of left side of the lattice, thereupon up through the interstices between fuel elements in the right half of the lattice array, and finally down around the exterior of the right half of the lattice and on out the outlet port 11, through the agency of the system of baffles 16, 16', 16". Thereupon, with the vacuum pump 13 operated continuously, as driven by electric motor 14, to maintain the interior of the fuel element 7, 7', 7" and the manifold system 4, 4', 4" highly evacuated, the control rods 18, 18', initially fully inserted into the lattice, are slowly withdrawn upward through the thimbles 17, 17', whereupon criticality of the amassment of uranium obtains, and a chain fission reaction is established within the lattice array. In the fission reaction, the neutrons produced by fission of the uranium-235 metal disposed on the interior of the fuel element tubes largely course through the walls of the tubes and through the water filling the interstices between the tubes in the lattice array, whence they are decelerated by the neutron-moderating action of the water, and in continuing through the lattice they again stream through the walls of fuel tubes to be themselves absorbed by the uranium-235 therein to produce subsequent fissions. Of those neutrons escaping from the lattice, many are reflected back into the lattice by the water surrounding the lattice array within the pressure vessel, thus markedly enhancing the neutron economy of the system.

As the fission reaction proceeds, gaseous fission products, especially xenon-135, formed within the layer of uranium disposed on the interior surfaces of the tubes, diffuse from the metal layer into the evacuated interior cavity of the tubes, and, under the action of the vacuum pump 13, are withdrawn forthwith through the manifold system 4, 4', 4", and discharged into the decay chamber 15—where their adverse neutron absorption propensities are no longer in position to interfere with the fission reaction proceeding in the amassment. Under the favorable influence of the elevated temperatures attained within the fuel elements during operation, such diffusion and withdrawal of fission products is especially accelerated and enhanced. With much of the obnoxious fission product contamination being so continuously removed from the core, the duration of operation of each fuel element before reprocessing of the U-235 content to remove neutron-absorptive fission product contamination is substantially extended, and the amount of excess fission material that must be incorporated in the amassment in order to provide sufficient neutrons to override the neutron-draining effect of fission product contamination which grows and accumulates during shutdown, in order to ensure the ability to restart at any time, is substantially minimized.

The fission reaction, being exothermic, liberates heat within the lattice which is transferred to the water flowing in intimate thermal contact with the fuel element tubes; by causing the water to make two passes through the lattice array by incorporating into the system the baffles 16, 16', 16", the flow velocity of the water is increased, which in turn increases the heat transfer coefficient between the fuel tubes and the water, and as a result substantially increases the efficiency of heat removal. The heated water, upon leaving through the outlet port 11, is passed to some conventional means for recovery of the generated heat, which represents the primary end product of the system; in normal practice the water from the pressure vessel 9, will be circulated through a closed loop, including: a pumping means for sustaining forced circulation of the water through the pressure shell, and a heat-exchanger for removing from the water heat generated within the core (neither shown). The rate at which the chain fission reaction proceeds, and hence the rate of heat production, may be increased or decreased to virtually any desired level that the materials of construction and structure will otherwise withstand, by merely further withdrawing or inserting, respectively, the control rods 18, 18'; by maintaining the water within the pressure shell pressurized to a considerable superatmospheric pressure, so as to avoid deleterious boiling, the reaction and heat generation may satisfactorily proceed with such intensity that the flowing water becomes heated to several hundred degrees Fahrenheit—temperatures at which the generated thermal power may be efficiently utilized in the conventional practical-scale heat-power engineering applications. For shutting down the reactor, the control rods 18, 18', are simply lowered all the way to a position of complete insertion into the lattice array, whereupon their highly-neutron-absorptive material content renders the amassments substantially sub-critical.

Further illustration of the quantitative aspects and preferred conditions and procedures of the instant fuel element and core system is provided in the following specific example.

EXAMPLE

A full scale neutronic reactor, substantially as illustrated in Figure 2, and incorporating tubular fuel elements as diagrammed in Figure 1, and adapted to the generation of steam by circulating the water through the core and through an external heat exchanger to heat and boil a separate system of water therein, has been designed as a prototype for like reactor systems of the same and much larger power production capacities. This reactor is especially adapted to mobile propulsion and to stationary industrial electrical-generating service, wherein the generated steam is used to drive a steam turbine, which in turn drives an electric generator. The general details of materials, dimensions, and operational parameters for such reactor are tabulated in Table I below.

*Table I.—Design and operational data for reactor system as illustrated in Figures 1 and 2*

| | |
|---|---|
| Fuel tubes: | |
|   Tubular structure— | |
|     Material | Beryllium metal. |
|     Internal diameter | 0.25 in. |
|     Outside diameter | 0.375 in. |
|     Length (of fissionable material layer) | 2 ft. |
|   Fissionable material— | |
|     Identity | Metallic uranium-235. |
|     Thickness | 0.00123 in. |
|   Fabrication | Welded. |
| Reactor: | |
|   Heat release rate | 66,200 kw. |
|   Diameter of lattice | 2.5 ft. |
|   Height of lattice (fuel layer) | 2 ft. |
|   Number of fuel tubes | 2850. |
|   Arrangement of fuel tubes | Equilateral triangles on ½" centers. |
|   External heating surface of tubes (2 ft. height) | 560 sq. ft. |
|   Internal surface of tubes (2 ft. height) | 372 sq. ft. |
|   Moderant and heat transfer medium | Water. |
|   Water pressure | 1675 p. s. i. |
|   Tube operating pressure stress | 3350 p. s. i. |
|   Water temperature entering reactor | 438° F. |
|   Water temperature leaving reactor | 478° F. |
|   Temperature differential between inside and outside of tubes: | |
|     Average | 43° F. |
|     Maximum | 65° F. |
|   Percent of water in lattice volume | 49%. |
|   Percent of beryllium in lattice volume | 28.2%. |
|   Percent of void in lattice volume | 22.8%. |
|   Thickness of water layer surrounding lattice serving as neutron reflector | 7½ in. (average). |
|   Water circulation rate | 12,000 gals./min. |
|   Number of passes of water through lattice | 2. |
|   Average velocity of water through lattice interstices | 26 ft./sec. |
|   Water pressure drop through pressure vessel | 25 p. s. i. |
|   Water inlet port | 14 in. diameter. |
|   Water outlet port | 14 in. diameter. |
|   Control rods— | |
|     Number | 10. |
|     Array | 2 rows of 5 each along chords of circular horizontal cross-section of lattice. |
|     Diameter | 2 in. |
|     Material | Cadmium sheet wrapped and bonded around stainless steel rod. |

Table 1.—*Design and operational data for reactor system as illustrated in Figures 1 and 2—Con.*

Manifold headers—
  Material _____ Beryllium.
  Outside diameter _____ 2 in.
  Inside diameter _____ 1½ in.
Connecting tubes—
  Material _____ Beryllium.
  Size _____ ¼″ outside diameter.
Vacuum pump _____ Commercial directly-coupled - electric-motor-driven piston vacuum pump.
Decay chamber—
  Size _____ Cylindrical tank 6 in. diam. x 1 ft. high.
  Pressure maintained _____ ca. 1 atm.
Pressure in tube interior cavities_ Highly evacuated.
Pressure vessel—
  Material _____ Steel.
  Thickness _____ 4 in. (average).
Mass of uranium-235 included___ 20 kg.

Although this invention has been described with particular emphasis upon the specific reactor design, suitable for practical application, outlined in the drawings, it is inherently susceptible to wide variation. For example, while utilization of a vacuum-pumping withdrawal technique to remove mobile fission product contamination from the interior cavities of the tubular fuel elements has been stressed, alternative removal by continuously sweeping a stream of inert gas, e. g. helium, under reduced pressure longitudinally through each fuel element would be advantageous, especially in high-powered operation. Too, where a minimization of the volume of the reactor is of particular importance, the volume of inactive void within the core may be reduced by locating pellets of a solid neutron moderant, such as beryllium, nonobstructively within the interior cavities of the fuel tubes; in this way, the increased moderation realized affords closer clustering of the fuel tubes within the lattice and consequently a more compact overall lattice, without greatly interfering with the removal of mobile fission products from the interior of the tubes. On the other hand, increasing the size of the reactor core, and operation with isotopically impure fission material, such as U-235 accompanied by U-238, is often advantageous in that the U-238 becomes transmuted under the neutron bombardment to Pu-239, thereby generating new fissionable fuel as the reaction proceeds; nevertheless other advantages, such as achieving minimum reactor size and weight, are afforded by operation with a completely isotopically isolated fissionable isotope—such as isotopically pure U-235—whereupon no such transmutation to Pu-239 will obtain. In the event that extensive production of new fissionable material during operation is a primary object, the present system is more readily adapted to this purpose by merely enlarging the reactor core, still employing substantially isotopically isolated fissionable isotope, but incorporating a fertile material, such as natural thorium (Th-232), in stationary disposition in the water bath, surrounding the core lattice, serving as the reflector; thereupon, the high thermal neutron flux converts Th-232 to Th-233, which forthwith spontaneously decays, through Pa-233, to fissionable U-233. Other variations and applications of the hereinbefore-disclosed fuel element and reactor core system will become apparent to those skilled in the art. It is, therefore, to be understood that all matters contained in the above description and example are illustrative only and do not limit the scope of the present invention.

What is claimed is:

1. In a neutronic reactor comprising a quantity of a material selected from the group consisting of uranium-235, plutonium-239, and uranium-233 adapted to be maintained in an amassment, and while so amassed to engage in self-sustaining chain fission reaction, an improved operationally-integrated core system which comprises a plurality of closed tubes substantially impervious to fluids, a layer of material comprising a material selected from the group consisting of uranium-235, plutonium-239, and uranium-233 disposed upon the interior surface of each of said tubes, a closed manifold substantially impervious to fluids the interior of which communicates with the interior of each of said tubes, and means connected to said manifold for withdrawing and disposing of gases from the interior of said manifold and tubes.

2. The core system of claim 1 wherein said layer of material is of thinness of the order of 1 mil, and is thin with respect to the internal dimensions of said tubes.

3. The core system of claim 1 wherein said tubes are constituted of beryllium metal.

4. The core system of claim 1 wherein said means for withdrawing and disposing of gases from the interior of said manifold and tubes comprises a vacuum pump.

5. The core system of claim 1 wherein said selected material is uranium metal.

6. The core system of claim 1 wherein said selected material is metallic uranium-235, and said layer thereof is of thinness of the order of 1 mil.

7. The core system of claim 1 wherein said means for withdrawing and disposing of gases from the interior of said manifold and tubes comprises a bed of activated charcoal in communication with the manifold and tubes, all highly evacuated.

8. The core system of claim 1 wherein said means for withdrawing and disposing of gases from the interior of said manifold and tubes comprises a refrigerated bed of adsorbent in communication with the manifold and tubes, all highly evacuated.

9. In a neutronic reactor comprising a quantity of a material selected from the group consisting of uranium-235, plutonium-239, and uranium-233 adapted to be maintained in an amassment, and while so amassed to engage in self-sustaining chain fission reaction, an improved operationally-integrated core system for such a reactor, which comprises a multiplicity of elongated, spaced, co-extensive tubes substantially impervious to fluids, a layer of material comprising a material selected from the group consisting of uranium-235, plutonium-239, and uranium-233 of thinness of the order of 1 mil disposed upon the interior surface of each of said tubes, a matrix of a neutron moderant wherein said multiplicity of tubes is disposed, a closed manifold substantially impervious to fluids the interior of which communicates with the interior of each of said tubes, and means connected to said manifold for withdrawing and disposing of gases from the interior of said manifold tubes.

10. The core system of claim 9 wherein said matrix of neutron moderant is a body of water wherein said multiplicity of spaced tubes is immersed.

11. The core system of claim 9 wherein said selected material comprises metallic uranium-235, wherein said matrix of neutron moderant comprises a body of water wherein said multiplicity of tubes is immersed, and wherein the overall molar ratio of said water to said uranium-235 within the confines of said immersed multiplicity is of at least the order of 100:1.

12. In a neutronic reactor comprising a quantity of a material selected from the group consisting of uranium-235, plutonium-239, and uranium-233 adapted to be maintained in an amassment and while so amassed to engage in self-sustaining chain fission reaction, an improved operationally-integrated core system for such a reactor which comprises a multiplicity of closed, elongated, spaced, co-extensive tubes substantially impervious to fluids, a layer of material comprising a material selected from the group consisting of uranium-235, plutonium-239, and uranium-233 of thinness of the order of 1 mil disposed upon the interior surface of each of said tubes, a matrix of a neutron moderant wherein said multiplicity of tubes is disposed, a continuously-flowing stream of a fluid heat-transfer medium maintained in heat-transfer relationship with said multiplicity of tubes, a closed manifold substantially impervious to fluids the interior of which communicates with the interior of each of said tubes, and means connected to said manifold for withdrawing and disposing of gases from the interior of said manifold tubes.

13. The core system of claim 12 wherein said body of flowing water is restrained by a system of baffles adapted to cause said body to flow as a stream successively through the interstices of a plurality of different portions of said immersed multiplicity of tubes thereby increasing the flow velocity of the water and in turn increasing the heat transfer coefficient between the exteriors of said tubes and the water, toward thereby increasing the efficiency of heat removal from said multiplicity of tubes by said water.

14. In a neutronic reactor comprising a quantity of a material selected from the group consisting of uranium-235, plutonium-239, and uranium-233 adapted to be maintained in an amassment, and while so amassed to engage in self-sustaining chain fission reaction, an improved operationally-integrated core system for such a reactor, which comprises a multiplicity of closed, elongated, spaced, co-extensive tubes substantially impervious to fluids, a layer of material comprising a material selected from the group consisting of uranium-235, plutonium-239, and uranium-233 of thinness of the order of 1 mil disposed upon the interior surface of each of said tubes, a body of flowing water maintained at substantial superatmospheric pressure wherein said multiplicity of tubes is immersed, a closed manifold substantially impervious to fluids the interior of which communicates with the interior of each of said tubes, and means connected to said manifold for withdrawing and disposing of gases from the interior of said manifold and tubes.

15. In a neutronic reactor comprising a quantity of a material selected from the group consisting of uranium-235, plutonium-239, and uranium-233 adapted to be maintained in an amassment, and while so amassed to engage in self-sustaining chain fission reaction, an improved operationally-integrated core system for such a reactor, which comprises a multiplicity of closed, elongated, spaced, co-extensive tubes substantially impervious to fluids, a layer of material comprising a material selected from the group consisting of uranium-235, plutonium-239, and uranium-233, of thinness of the order of 1 mil disposed upon the interior surface of each of said tubes, a body of flowing water maintained under substantial superatmospheric pressure wherein said multiplicity of tubes is immersed, said body of water being of dimensions larger in all directions than those of said multiplicity of tubes, thereby enveloping said multiplicity in a layer of water for serving as a neutron reflector, a closed manifold substantially impervious to fluids the interior of which communicates with the interior of each of said tubes, a vacuum pump connected to said manifold for withdrawing and disposing of gases from the interior of said manifold and tubes, and a closed chamber adapted to receive gases so withdrawn by said vacuum pump.

16. The core system of claim 15 wherein said tubes are constituted of beryllium metal.

References Cited in the file of this patent

UNITED STATES PATENTS

| | | |
|---|---|---|
| 1,076,424 | Held | Oct. 21, 1913 |
| 1,254,344 | Murphy | Jan. 22, 1918 |
| 1,349,999 | Balke | Aug. 17, 1920 |
| 2,743,226 | Newson | Apr. 24, 1956 |
| 2,708,656 | Fermi et al. | May 17, 1956 |

OTHER REFERENCES

Dunning et al.: Physical Review, vol. 48, p. 268 (1935).
Kelly et al.: Physical Review, vol. 73, pp. 1135–1139 (1948).
Ohlinger: Nucleonics, February 1950, pp. 57–59.

UNITED STATES PATENT OFFICE
CERTIFICATE OF CORRECTION

Patent No. 2,851,409 September 9, 1958

William T. Moore

It is hereby certified that error appears in the printed specification of the above numbered patent requiring correction and that the said Letters Patent should read as corrected below.

Column 8, line 20, before "or", strike out "helium"; line 21, after "as", insert -- helium --; column 9, line 2, for "isotypically" read -- isotopically --; line 55, for "consituted" read -- constituted --; line 66, for "approximately" read -- approximating --; column 10, line 18, for "extremty" read -- extremity --; line 53, for "chamfered" read -- chamferred --.

Signed and sealed this 10th day of March 1959.

(SEAL)

Attest:

KARL H. AXLINE
Attesting Officer

ROBERT C. WATSON
Commissioner of Patents